(12) United States Patent
Grammenz

(10) Patent No.: US 6,484,959 B1
(45) Date of Patent: Nov. 26, 2002

(54) DENTAL TUBING AND CABLE RETRACTION APPARATUS

(76) Inventor: Derik Grammenz, 310 Paxton Crescent, Newmarket, Ontario (CA), L3X 2C3

( * ) Notice: Subject to any disclaimer, the term of this patent is extended or adjusted under 35 U.S.C. 154(b) by 0 days.

(21) Appl. No.: 09/886,091

(22) Filed: Jun. 22, 2001

(51) Int. Cl.[7] .......................... B65H 75/38; H02G 11/00
(52) U.S. Cl. ................... 242/388.9; 137/355.2; 191/12 R
(58) Field of Search .................. 242/388.9, 388.91; 137/355.17, 355.2, 355.16; 191/12 R

(56) References Cited

U.S. PATENT DOCUMENTS

| | | | |
|---|---|---|---|
| 3,180,585 A | * | 4/1965 | Pusey et al. ............. 242/388.9 |
| 3,372,883 A | | 3/1968 | Ota |
| 3,487,850 A | | 1/1970 | Wahler et al. |
| 3,514,171 A | | 5/1970 | McGaha |
| 3,623,501 A | * | 11/1971 | Reimbold .............. 137/355.17 |
| 3,693,258 A | | 9/1972 | Fulton et al. |
| 3,895,764 A | | 7/1975 | Roland |
| 4,114,273 A | | 9/1978 | McGaha |
| 4,151,648 A | | 5/1979 | Hirth |
| 4,345,616 A | * | 8/1982 | Terry .................... 137/355.17 |
| 4,421,483 A | * | 12/1983 | Pietschmann et al. ........ 433/77 |
| 4,470,811 A | | 9/1984 | Heubeck |
| 5,145,366 A | * | 9/1992 | Janhunen ..................... 433/77 |
| 5,273,427 A | * | 12/1993 | Austin, Jr. et al. ............ 433/28 |
| 5,450,874 A | | 9/1995 | Hamula |
| 5,775,354 A | | 7/1998 | Upton |
| 5,873,717 A | | 2/1999 | Behringer |

FOREIGN PATENT DOCUMENTS

| | | |
|---|---|---|
| CA | 1111679 | 11/1981 |
| JP | 62133308 | 12/1988 |
| JP | 05334135 | 7/1995 |

\* cited by examiner

*Primary Examiner*—Kathy Matecki
*Assistant Examiner*—Minh-Chau Pham

(57) ABSTRACT

A dental tubing and cable retraction apparatus is provided to selectively retract and release dental tubing and cabling from a cabinet when not in use, to a work site when in use. The apparatus comprises a single acting pneumatic cylinder, a cylinder rod, an actuator arm connector, an actuator arm and a pneumatic actuator switch. When the cylinder is disconnected from a source of pneumatic pressure, the cylinder rod is freely moving axially within the cylinder; when the cylinder is actuated by being connected to a source of pneumatic pressure, the cylinder rod is extended from the cylinder. The first end of the actuator arm is pivotally connected to the actuator arm connector at the outer end of the cylinder rod. A guide loop is pivotally attached to the second end of the actuator arm, and the dental tubing or cabling is fed through the guide loop so as to be retracted when the cylinder is actuated.

7 Claims, 2 Drawing Sheets

DENTAL TUBING AND CABLE RETRACTION APPARATUS

FIELD OF THE INVENTION

The present invention relates to apparatus for use by dental practitioners, specifically dentists, dental hygienists, dental therapists, oral surgeons, and the like. The present invention provides an apparatus which retracts dental tubing or cabling which is attached to or associated with various dental instruments used by the dental practitioner, when the dental instruments are not in use. However, when the dental instruments are to be used by the dental practitioner, and are removed from a holder therefor, the associated dental tubing or cabling is released from its retracted position so that it may be pulled into place at the dental work site by the dental practitioner.

BACKGROUND OF THE INVENTION

Typically, dental practitioners—most usually dentists and dental hygienists and the like—employ a number of different dental instruments while performing many different dental procedures on their patients. Several of those dental instruments might be used at one time, for example a turbine and a suction device, x-ray or video camera devices together with a suction device, and so on. Typically, there may be four or as many as eight such devices that may be employed by the dental practitioner, and they are arranged in a cabinet which is placed either at the head of the patient when the patient is in a dental chair, or at the side of the patient when the patient is in a dental chair. The practitioner will work on the patient while standing or sitting beside the patient at either side or at the top of the patient's head; and the various instruments will be employed by the dental practitioner by being brought to the dental work site in the patient's mouth with their associated dental tubing or dental cabling being placed beside the head or beside the shoulder of the patient.

However, when the dental practitioner no longer wants to use the dental instrument, he or she will place the dental instrument back into the holder on the cabinet, together with the other dental instruments which may be employed. Unfortunately, each of those dental instruments is associated with dental tubing or cabling, and unless that dental tubing or cabling is retracted into the cabinet, it could get tangled with other dental tubing or cabling, or it could become a hazard over which the dental practitioner or a dental assistant could trip. Moreover, if the dental tubing or dental cabling becomes entangled or snarled, and a circumstance arises where the dental practitioner suddenly and quickly requires the use of one of the dental instruments, it may be possible that the dental instrument is not available immediately due to the entanglement of its respective dental tubing or dental cabling with the dental tubing and dental cabling of other instruments.

The present invention provides a simple and effective solution to the problem of retracting and releasing dental tubing and dental cabling, by taking advantage of certain facts relating generally to the practice of dentistry—at least as it is known in North America. Specifically, the present invention acknowledges that modem dental instruments are provided which either are associated with pneumatic tubing, hoses, and the like, or certain dental instruments may be associated with optical fibre. In either case, the dental tubing or cabling is flexible. Also, when dental tubing is employed, as noted, it will either be connected to a source of suction; and more particularly, for dental instrumentation required for drilling or polishing, and the like, all such instrumentation is pneumatically driven. Belt driven instrumentation is no longer employed.

Thus, it is convenient in the organization of a dental practitioner's operatory to gather all of the dental instruments which will be employed into a single cabinet, located beside or at the head of the patient, as noted above. That cabinet will be connected to a source of pneumatic pressure; and that fact is employed by the present invention.

The present invention also provides fail-safe operation. That is, if there is a source of pneumatic pressure whereby the dental practitioner can practice dentistry on patients, then that same source of pressure can be employed to ensure that the dental tubing and dental cabling associated with unused dental instrumentation at that instant in time is, indeed, retracted. If there is a failure of the source of pneumatic pressure, then the retraction of the dental tubing and dental cabling is relieved.

Still further, because a source of pneumatic pressure will be associated with the cabinet in which the dental tubing and dental cabling for the various dental instrumentation is to be retracted, the holder for each specific dental instrument can be associated with the source of pneumatic pressure in such a manner that when the respective dental instrument is removed from its holder, the respective dental tubing or dental cabling is released. This comes about as a consequence of the use of single-ended or single-acting pneumatic cylinders, which require connection to a source of pneumatic pressure if the cylinder rod or piston within the cylinder is to be extended. Immediately upon the release of pneumatic pressure—that is, immediately when the single-acting pneumatic cylinder is disconnected from the source of pneumatic pressure—the cylinder rod is free to move axially within the cylinder, without any appreciable resistance.

All of these matters are discussed in greater detail hereafter.

DESCRIPTION OF THE PRIOR ART

A number of prior art approaches are known, by which dental cabinet appliances, retractors, and the like, are provided. They include the following:

Suter Canadian Patent 1,111,679, issued Nov. 3, 1981, teaches a dental unit which is intended to position dental instruments at a location which is convenient to a seated or standing dentist. In particular, a four-bar linkage is provided which swings a holder for various dental instruments from a low stored position to an in-use position. In the lower position, the dental instruments are convenient to a seated dentist; in the higher position, the instrument holder is convenient to a dentist who is standing. However, there is no consideration given to the associated dental tubing or cabling for the various dental instruments.

Japanese Patent abstract 62133308, published Dec. 7, 1988, teaches a dental apparatus whose purpose is to make the delivery of the flexible hose for a handpiece sufficiently long, by providing a flying arm which tilts forwardly. The flexible hose is delivered forwardly while sliding through an elongated hole in a base, and thence through a hole on the flying arm. The purpose is to permit the flexible hose to be extended while reducing the space in which the apparatus is stored.

Another Japanese Patent Abstract, 05334135, published Jul. 25, 1995, teaches a device which winds instrument hose or tubing, wherein a pulley and block moves along a guide, with the instrument hose being wound around a pulley.

U.S. Pat. No. 3,372,883 issued Mar. 12, 1968 to Ota, teaches a rotatable apparatus that is employed to pay out or draw in dental hoses. Means are provided to bias the rotatable apparatus in one direction about the rotation axis, so as to thereby draw in the hose.

Wahler et al U.S. Pat. No. 3,487,850, issue Jan. 6, 1970, teaches a similar device where the flexible hose is wound onto a pulley-like arrangement which is spring biassed so as to return the hose to a storage position.

McGaha U.S. Pat. No. 3,514,171, issued May 26, 1970, teaches a dental instrument cabinet and storage mechanism in which a partitioned and compartmented housing has a plurality of individual compartments into each of which a separate instrument and connecting hose means may be stored. The compartmented storage means is slidably mounted in the interior of the housing and is pulled out from the housing when it is desired for the instruments to be used.

U.S. Pat. No. 3,693,258, issued Sep. 26, 1972 to Fulton et al teaches a retractor for a dental handpiece, where the retractor is equipped with a spring-supported weight which trips the release mechanism of the retractor when the hose is pulled abruptly. The dentist may select the length of the hose; and when the dentist wants the hose to be retracted, an abrupt pulling force upon the hose causes the hose to be retracted back into a cabinet.

Roland U.S. Pat. No. 3,895,764 issued Jul. 22, 1975, teaches a retracting device whose purpose is particularly to deliver and retrieve multichanneled hose as used by a dentist. The hose is wound onto a collecting reel; means are provided to ensure that the hose will not crimp or kink during the retrieving action.

Another patent issued to McGaha, U.S. Pat. No. 4,114,273, issued Sep. 19, 1978, teaches a very complicated console for extending and retracting operating flexible hoses, particularly in cases where the instrumentation is placed in an over-the-patient position. The extending and retracting of the flexible hose is controlled by a pawl and ratchet mechanism.

Hirth U.S. Pat. No. 4,151,648 issued May 1, 1979, teaches a dental apparatus which retracts supply hoses, and which employs a coil spring. The hose is interposed between windings of the spring, and when the hose is extended, the radius of the coil contracts, which causes control switches to be activated. A ratchet is employed to prevent unwanted retraction. When the ratchet is released, the coil spring expands thereby drawing the hose back into the housing.

Another device for storing dental handpieces is taught in Heuback U.S. Pat. No. 4,470,811 issued Sep. 11, 1984. Here, the hose for each dental handpiece is permitted to hang freely in a loop-like fashion, where a guidance roller together with another element guide the hose during movement of the handpiece from the stored position to an extended position. No attempt is made to retract or hide the dental tubing into a cabinet; and thus the housing is generally one which is employed in a relatively high position compared to the position of the patient.

Hamula U.S. Pat. No. 5,450,874, issued Sep. 19, 1995, teaches a device which retracts and stores a length of dental instrumentation hose. Here, the length of hose is anchored at one end and is routed under a spool and through an opening of an instrument panel. The hose hangs in a loop or bight with the spool supported on the bight, and the hose is kept under tension by the weight of the spool. When the dental instrument is to be used, the spool is lifted onto and secured by supports, and tension is thereby released from the hose. Then, a quick jerk or pull on the hose dislodges the spool from its support, causing it to fall vertically into the compartment and drawing the hose back into the compartment with it.

Another flexible hose assembly which employs weights is taught by Upton in U.S. Pat. No. 5,775,354, issued Jul. 7, 1998. However, in this case, the weights do not interact with the dental hose per se. A "block and tackle" arrangement is provided, where the counterweights are at least partially immersed in a damping liquid. The purpose is to prevent hose snap-back. It should be noted, however, that the hoses are of the sort generally used in automobile repair and service centres, of the sort that may deliver water or air to the mechanic working on a vehicle.

Finally, Behringer U.S. Pat. No. 5,873,717, issued Feb. 23, 1999, teaches another device where supply hoses are essentially permitted to hang free. The purpose is to preclude activation of a dental handpiece until such time as it has been lifted away from a holder.

SUMMARY OF THE INVENTION

The present invention provides an apparatus for selectively retracting and releasing dental tubing and dental cabling, whereby the dental tubing and dental cabling is retracted into a cabinet when it is not in use, and is released so as to be extended to a work site when in use. The apparatus comprises the following:

First, there is a single-acting pneumatic cylinder having a cylinder rod which is freely moving axially within the cylinder when the cylinder is disconnected from a source of pneumatic pressure. The cylinder rod is extended from the cylinder when the cylinder is actuated by being connected to a source of pneumatic pressure.

There is an actuator arm connector which is secured to the outer end of the cylinder rod, and is movable therewith.

An actuator arm having first and second ends is pivotally connected at its first end to the actuator arm connector. The second end of the actuator arm has a guide loop pivotally attached thereto.

There is also provided a pneumatic actuator switch which is mounted on the cabinet for selective actuation of the pneumatic cylinder.

The actuator arm is pivotally mounted on a pivot axis which is located at a point intermediate the first and second ends thereof. The mounting is such that when the pneumatic cylinder is actuated by being connected to source of pneumatic pressure, the second end of the actuator arm is located at a position behind the pivot axis. Also, when the pneumatic cylinder is deactivated by being disconnected from a source of pneumatic pressure, whereby the cylinder rod is freely axially movable within the cylinder, the second end of the actuator arm may be located at a position which is in front of the pivot axis.

A length of dental tubing or a length of dental cabling is passed through the guide loop in such a manner that when the pneumatic cylinder is actuated by the pneumatic actuator switch connecting the pneumatic cylinder to a source of pneumatic pressure, the guide loop is behind the pivot axis and the dental tubing or dental cabling is retracted into the cabinet within which the apparatus is mounted. When the pneumatic cylinder is deactivated by being disconnected by the pneumatic actuator switch from the source of pneumatic pressure, the dental tubing or dental cabling may be withdrawn from the cabinet so as to be extended to a work site by a dental practitioner.

Typically, the guide loop is formed of a smooth, plastics material.

Also, typically there is a wrap bar which is located in the cabinet below and in front of the pivot axis. The dental tubing or dental cabling is passed in front of the wrap bar when the pneumatic cylinder is actuated.

The apparatus of the present invention may further include a pneumatic safety cut-off switch, whereby the pneumatic cylinder may be deactivated by selectively placing the pneumatic safety cut-off switch in its cut-off position.

In that case, it is usual that the pneumatic safety cut-off switch is physically associated with the pneumatic actuator switch.

In the apparatus of the present invention, any dental instrument may be associated with the dental tubing or dental cabling, and the dental instrument is placed into the pneumatic actuator switch when it is not in use.

The pneumatic actuator switch is normally activated when the dental instrument is placed therein, and it is deactivated when the dental instrument is removed therefrom.

Thus, when the dental instrument is placed in the pneumatic actuator switch, the switch is activated so as to actuate the pneumatic cylinder, and so as to retract the dental tubing or dental cabling into the cabinet.

On the other hand, when the dental instrument is removed from the pneumatic actuator switch, the switch is deactivated so as to deactuate the pneumatic cylinder, and so as to permit the dental tubing or dental cabling to be extended away from the cabinet, to a work site.

In the circumstances wherein a length of dental tubing is associated with a pneumatically operated dental instrument, that pneumatically operated dental instrument will be pneumatically parallel to the pneumatic cylinder, and the parallel pneumatic cylinder and pneumatically operated dental instrument are pneumatically in series with the pneumatic activator switch and a source of pneumatic pressure.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which.

DETAILED DESCRIPTION OF THE PREFERRED EMBODIMENTS

The novel features which are believed to be characteristic of the present invention, as to its structure, organization, use and method of operation, together with further objectives and advantages thereof, will be better understood from the following discussion.

Figure 1:
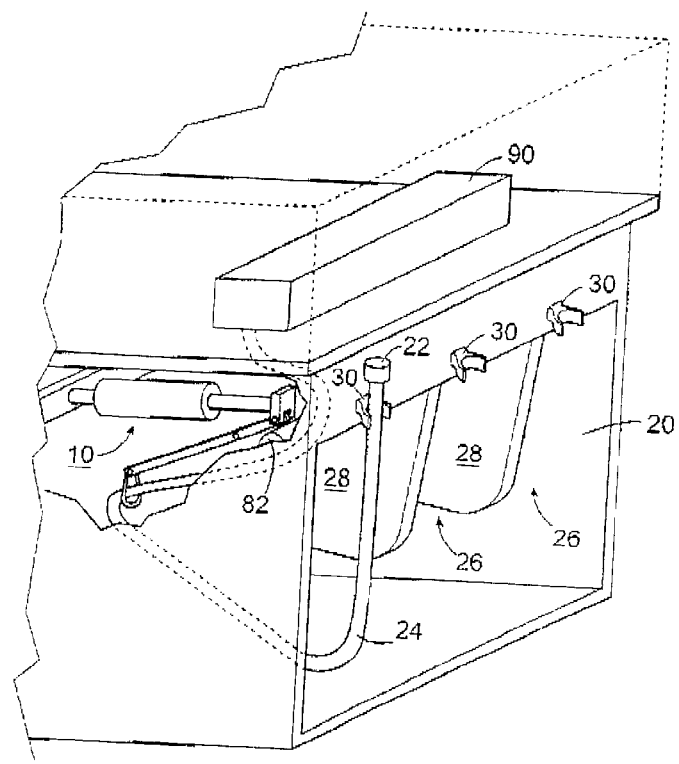
FIG. 1 shows a typical cabinet being arranged for storage of a plurality of dental instruments, each of which is associated with its own respective dental tubing or dental cabling.

Referring first to FIG. 1, a cabinet 20 is shown, in which a plurality of dental instruments and their associated dental tubing and dental cabling, are stored. A break away portion is shown, in which the apparatus indicated generally at 10 in each of FIGS. 1 to 4 is shown being mounted within the cabinet 20.

Typically, all of the functioning apparatus of the present invention is placed in a drawer or otherwise located near the top of the cabinet; and as noted above, typically the cabinet 20 is placed at the head or side of the dental chair so as to be convenient to the dental practitioner.

Any typical dental instrument or handpiece may be employed, such as a coupler for a typical end piece 22 as shown, being associated with a length of dental tubing 24. That dental tubing may be pneumatic tubing or, in the case of a suction piece, hydraulic or un-pressurized; it may also be a length of electrical cable, or more particularly a length of fibreoptic cable together with associated electrical cabling such as would be employed with a video camera that might be employed in certain dental procedures. High voltage cabling of the sort employed for portable x-ray devices may also be found in some circumstances.

In any event, a plurality of compartments 26 are found within the cabinet 20, being separated from each other by dividers 28.

A plurality of dental instrument holders 30 is employed, one for each dental instrument. It will be learned hereafter that each holder is associated with a pneumatic actuator switch.

As discussed, the purpose of the apparatus shown generally at 10 is to selectively retract or release dental tubing or cabling 24, so that the dental tubing or dental cabling 24 may be retracted into the cabinet 20 when it is not in use, and it may be released so as to be extended to a work site when it is in use.

Figure 2:
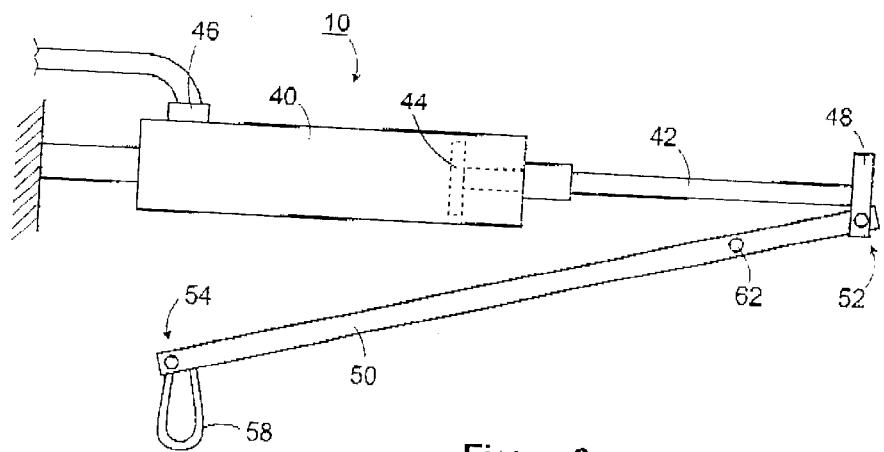
FIG. 2 is a general schematic showing the relative positions of the physical components of the present invention, when the pneumatic switch is actuated so as to be in a retracting position.

The apparatus 10 includes a single-acting pneumatic cylinder 40. There is a cylinder rod 42, which is adapted to move freely axially within the cylinder 40 when the cylinder is disconnected from a source of pneumatic pressure. Within the cylinder 40 there is a pressure plate 44; and when pneumatic pressure is applied to the end of the cylinder 40, at 46, the pneumatic pressure acts against the pressure plate 44 to force the cylinder rod 42 to its extended position as shown in FIG. 2. That position is defined herein as the actuated condition for the cylinder 40.

When the source of pneumatic pressure to the pneumatic cylinder 40 is relieved, then, as noted, the cylinder rod 42 and the pressure plate 44 are free to move axially back and forth within the cylinder 40.

An actuator arm connector 48 is secured to the outer end of the cylinder rod 42, so that it is movable with the cylinder rod 42 back and forth in an axial direction relative to the pneumatic cylinder 40.

An actuator arm 50 has first and second ends 52 and 54, respectively, and it is pivotally connected to the actuator arm connector 48 at the first end 52. At the second end 54, there is a guide loop 58 which is pivotally attached to the actuator arm 50.

A pneumatic actuator switch 60 is mounted on the cabinet 20, for selective actuation of the pneumatic cylinder 10. In fact, the pneumatic actuator switch 60 is associated with and forms an integral part of the hanger 30 which is provided for each dental instrument.

It will be seen that the actuator arm 50 is pivotally mounted on a pivot axis 62, which is located at a point that is intermediate the first and second ends 52 and 54 of the actuator arm 50. The mounting is such that when the pneumatic cylinder is actuated, as shown in FIG. 2, by being connected to a source of pneumatic pressure—indicated generally at 80 in FIG. 4—the second end 54 of the actuator arm 50 is located at a position which is behind the pivot axis 62. It will be understood that, in the present discussion, the terms "behind" and "in front of" are, of course, relative; but will be understood to mean to the left and right of the Figures as being described herein.

Figure 3:
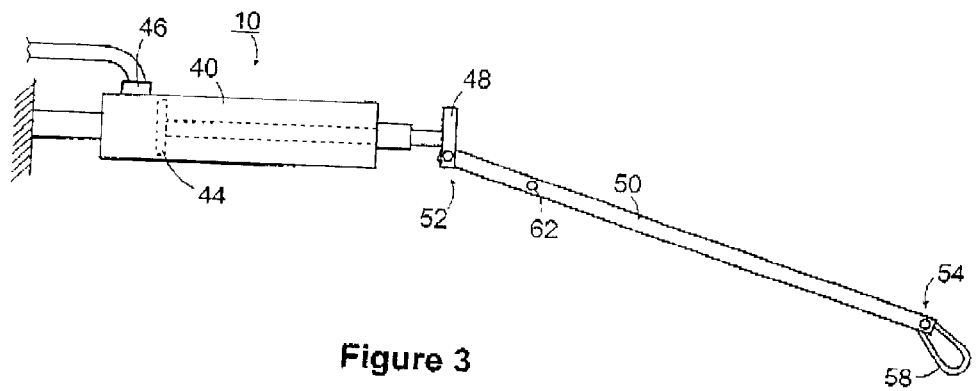
FIG. 3 is a view similar to FIG. 2, when the pneumatic cylinder is deactuated.

When the pneumatic cylinder 40 is deactuated by being disconnected from the source of pneumatic pressure, so that the cylinder rod 42 is freely axially movable within the cylinder 40, as shown in FIG. 3, the second end 54 of the actuator arm can be swung forward relative to the pivot axis 62 so as to be in front of the pivot axis.

A length of dental tubing or a length of dental cabling is passed through the guide loop 58 in such a manner that when the pneumatic cylinder is actuated, so as to adopt the position indicated in FIG. 2, the guide loop 58 is behind the pivot axis 62, and the dental tubing or dental cabling 24 is retracted into the cabinet 20. This is shown in dashed lines in FIG. 4.

On the other hand, when the pneumatic cylinder 40 is disconnected by the pneumatic actuator switch 60 from the source of pneumatic pressure 80, then the dental tubing or dental cabling 24 may be withdrawn from the cabinet so as to be extended to a work site by the dental practitioner. This is shown by dash dot lines in FIG. 4.

Figure 4:
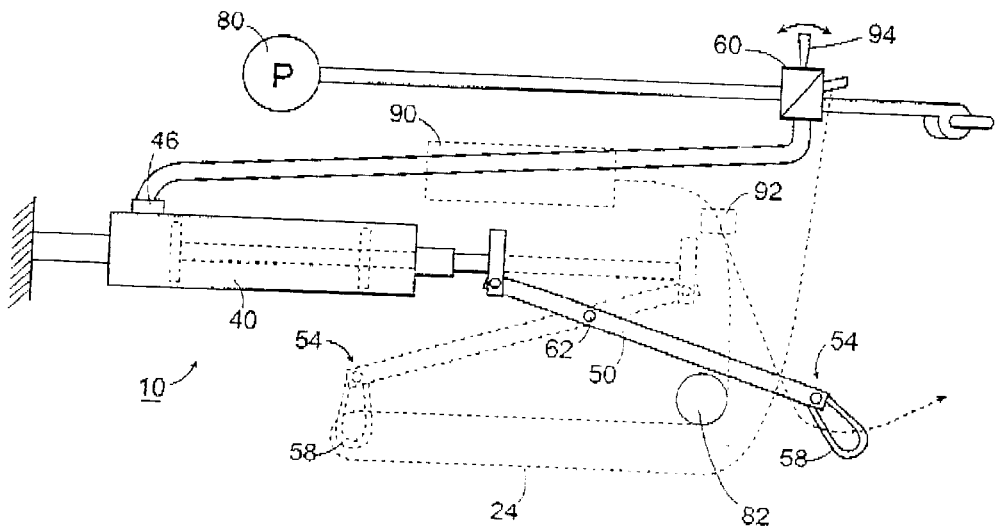
FIG. 4 is a view combining FIGS. 2 and 3 together with a pneumatic circuit, and also illustrating a length of dental tubing or dental cabling when it is in its retracted or extended condition.

It will be understood that the dental tubing or dental cabling 24 is connected to a control panel or other source of energy, control signals, or the like, shown generally at 90 in FIGS. 1 and 4. Typically, the dental tubing or dental cabling 24 passes through a clip or anchor 92.

It will be seen that the dental tubing or dental cabling 24 passes through the guide loop 58; and it will be understood that when the pneumatic cylinder 40 is deactuated so that the cylinder rod 42 is freely movable axially within the cylinder, then a slight tug on the dental tubing or dental cabling 24 as it is being withdrawn to the work site will cause the actuator arm 50 to freely pivot about the pivot axis 62. On the other hand, as soon as the pneumatic actuator switch 60 is activated by placing the respective dental instrument back into its holder 30, the pressure plate 44 will immediately be moved to the right as seen in the Figures, the actuator arm 50 will be pivoted clockwise about the pivot axis 62, and it will assume the position as shown in FIG. 2. As seen in FIG. 4, that will result in withdrawal or retraction of the dental tubing or dental cabling 24, away from the work site.

Typically, so as not to cause any damage to the dental tubing or dental cabling 24, the guide loop 58 is formed of a smooth plastics material. Such materials as polyethylene, polypropylene, PTFE, and other appropriate plastics as known to those skilled in the art, may be employed.

In general, a wrap bar 82 is fixed in place as shown in FIGS. 1 and 4. The wrap bar 82 is located in the cabinet 20 in a position which is below and in front of the pivot axis 62. Thus, as can be seen in FIG. 4, the dental tubing or dental cabling 24 is passed in front of the wrap bar 82 when the pneumatic cylinder 40 has been actuated and the dental tubing or dental cabling 24 has been retracted.

There may also be a pneumatic safety cut-off switch 94 which is provided. Its purpose is to cut-off the pneumatic pressure, and thereby to disconnect the pneumatic cylinder from the source of pneumatic pressure, if necessary, by placing the pneumatic safety cut-off switch 94 in its cut-off position.

Generally, the pneumatic safety cut-off switch 94 is physically associated with the pneumatic actuator switch 60.

As noted above, typically any dental instrument which is associated with the dental tubing or dental cabling 24 is placed into the pneumatic actuator switch 60 which is associated with the holder 30, when the dental instrument is not in use. Thus, the pneumatic actuator switch 60 is one which is normally activated when the dental instrument is placed therein, and is deactivated when the dental instrument is removed therefrom. This provides a safety or fail-safe characteristic, by precluding inadvertent deactuation of the pneumatic cylinder 40, and therefore precluding inadvertent withdrawal of the dental tubing or dental cabling 24 when it is not wanted. On the other hand, it is not likely that the dental practitioner will be working with a patient in the event that there is a loss of pneumatic pressure; so that the dental practitioner can be assured that the dental tubing or dental cabling 24 for the unused dental instruments will, in fact, be retracted and out of the way.

Conversely, of course, when the dental instrument is removed from the pneumatic actuator switch 60, the switch is deactivated so as to deactuate the pneumatic cylinder 40 and thus so as to permit the dental tubing or dental cabling 24 to be extended away from the cabinet to a work site.

As shown in FIG. 4, it is typical that a pneumatically operated dental instrument will be pneumatically parallel to the pneumatic cylinder 40. Also, the parallel pneumatic cylinder 40 and the pneumatically operated dental instrument are pneumatically in series with the pneumatic activator switch 60 and the source of pneumatic pressure 80.

Typically, the length of any section of dental tubing or dental cabling 24 which is employed, is about 48 to 72 inches, usually about 54 inches.

When the dental instrument is a pneumatically operated handpiece, for example, it is typically controlled by a floor-mounted pneumatic switch (not shown). However, for purposes of safety, that switch may be in series with switch 60.

It will be understood, of course, that each separate dental instrument that is to be employed by the dental practitioner will have its own hanger 30, its own compartment 26, and its own retraction apparatus 10. Accordingly, if the dental practitioner employs four or six or eight dental instruments that will be stored in the cabinet 20, together with their associated dental tubing or dental cabling, then there will be that many individual retraction devices 10 that will also be employed.

An apparatus for selectively retracting and releasing dental tubing and dental cabling has been illustrated and described, for purposes of explanation and example, and it will be clearly understood by those skilled in the art that other variations and embodiments of the apparatus beyond those which have been shown and described may be employed, without departing from the spirit and scope of the appended claims.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

What is claimed is:

1. An apparatus for selectively retracting and releasing dental tubing and dental cabling, whereby said dental tubing and dental cabling is retracted into a cabinet when not in use, and is released so as to be extended to a work site when in use, said apparatus comprising:

a single acting pneumatic cylinder having a cylinder rod which is freely moving axially within said cylinder when said cylinder is disconnected from a source of pneumatic pressure, and wherein the cylinder rod is extended from said cylinder when said cylinder is actuated by being connected to the source of pneumatic pressure;

an actuator arm connector secured to the outer end of said cylinder rod, and moveable therewith;

an actuator arm having first and second ends, said first end being pivotally connected to said actuator arm connector, and said second end having a guide loop pivotally attached thereto; and a pneumatic actuator switch mounted on the cabinet for selective actuation of said pneumatic cylinder;

wherein said actuator arm is pivotally mounted on a pivot axis which is located at a point intermediate said first and second ends, in such a manner that when said pneumatic cylinder is actuated by being connected to the source of pneumatic pressure, said second end of said actuator arm is located at a position behind said pivot axis; and when said pneumatic cylinder is deactivated by being disconnected from the source of pneumatic pressure, whereby said cylinder rod is freely axially movable within said cylinder, said second end of said actuator arm may be located at a position in front of said pivot axis;

wherein a length of dental tubing or a length of dental cabling is passed through said guide loop in such a manner that when said pneumatic cylinder is actuated by said pneumatic actuator switch connecting said pneumatic cylinder to the source of pneumatic pressure, said guide loop is behind said pivot axis, and the dental tubing or dental cabling is retracted into the cabinet within which said apparatus is mounted; and when said pneumatic cylinder is deactivated by being disconnected by said pneumatic actuator switch from said source of pneumatic pressure, said dental tubing or dental cabling may be withdrawn from said cabinet so as to be extended to a work site by a dental practitioner.

2. The apparatus of claim 1, wherein said guide loop is formed of a plastics material.

3. The apparatus of claim 1, wherein a wrap bar is located in said cabinet below and in front of said pivot axis; and wherein said dental tubing or dental cabling is passed in front of said wrap bar when said pneumatic cylinder is actuated.

4. The apparatus of claim 1, further including a pneumatic safety cut-off switch, whereby said pneumatic cylinder may be deactivated by selectively placing said pneumatic safety cut-off switch in its cut-off position.

5. The apparatus of claim 4, wherein said pneumatic safety cut-off switch is physically associated with said pneumatic actuator switch.

6. The apparatus of claim 1, wherein a dental instrument is associated with the dental tubing or dental cabling, and wherein the dental instrument is placed into said pneumatic actuator switch when it is not in use;

wherein said pneumatic actuator switch is normally activated when said dental instrument is placed therein, and is deactivated when said dental instrument is removed therefrom;

whereby, when said dental instrument is placed in said pneumatic actuator switch, the switch is activated so as to actuate said pneumatic cylinder, and so as to retract said dental tubing or dental cabling into said cabinet; and when said dental instrument is removed from said pneumatic actuator switch, the switch is deactivated so as to deactuate said pneumatic cylinder, and so as to permit said dental tubing or dental cabling to be extended away from said cabinet, to a work site.

7. The apparatus of claim 6, wherein a pneumatically operated dental instrument is pneumatically parallel to said pneumatic cylinder, and said parallel pneumatic cylinder and said pneumatically operated dental instrument are pneumatically in series with said pneumatic activator switch and the source of pneumatic pressure.

* * * * *